United States Patent [19]

Di Rosa

[11] 4,427,375

[45] Jan. 24, 1984

[54] FLUIDIZED BED FURNACE

[75] Inventor: Gaetano Di Rosa, Pino Torinese, Italy

[73] Assignee: Fata European Group S.p.A., Turin, Italy

[21] Appl. No.: 332,101

[22] Filed: Dec. 17, 1981

[30] Foreign Application Priority Data

Dec. 24, 1980 [IT] Italy ............................... 68991 A/80

[51] Int. Cl.³ ...................... F27B 15/00; F23D 19/00; F23G 5/00
[52] U.S. Cl. ...................................... 432/58; 110/245; 431/170
[58] Field of Search .......................... 432/58; 110/245; 431/170

[56] References Cited

U.S. PATENT DOCUMENTS 4,148,437  4/1979  Barker et al. ........................ 431/170
4,309,948  1/1982  Zielinski ............................... 431/170
4,311,278  1/1982  Sutton .................................... 432/58

FOREIGN PATENT DOCUMENTS 7300988  7/1973  Netherlands ........................... 432/58

Primary Examiner—John J. Camby
Attorney, Agent, or Firm—Birch, Stewart, Kolasch & Birch

[57] ABSTRACT

In a calcining furnace usable particularly for regenerating sands used in casting boxes and cores, a bed of refractory particles is fluidized by means of a combustible gas which is fed into the bed together with air, so as to enable the combustible gas to burn. The base wall on which the bed of refractory particles is supported has a plurality of holes for the air supply. Each hole for the air supply has associated therewith a nozzle for supplying the combustible gas, disposed coaxially with the respective hole and having at least one discharge aperture for the combustible gas disposed adjacent the plane of the base plate.

11 Claims, 5 Drawing Figures

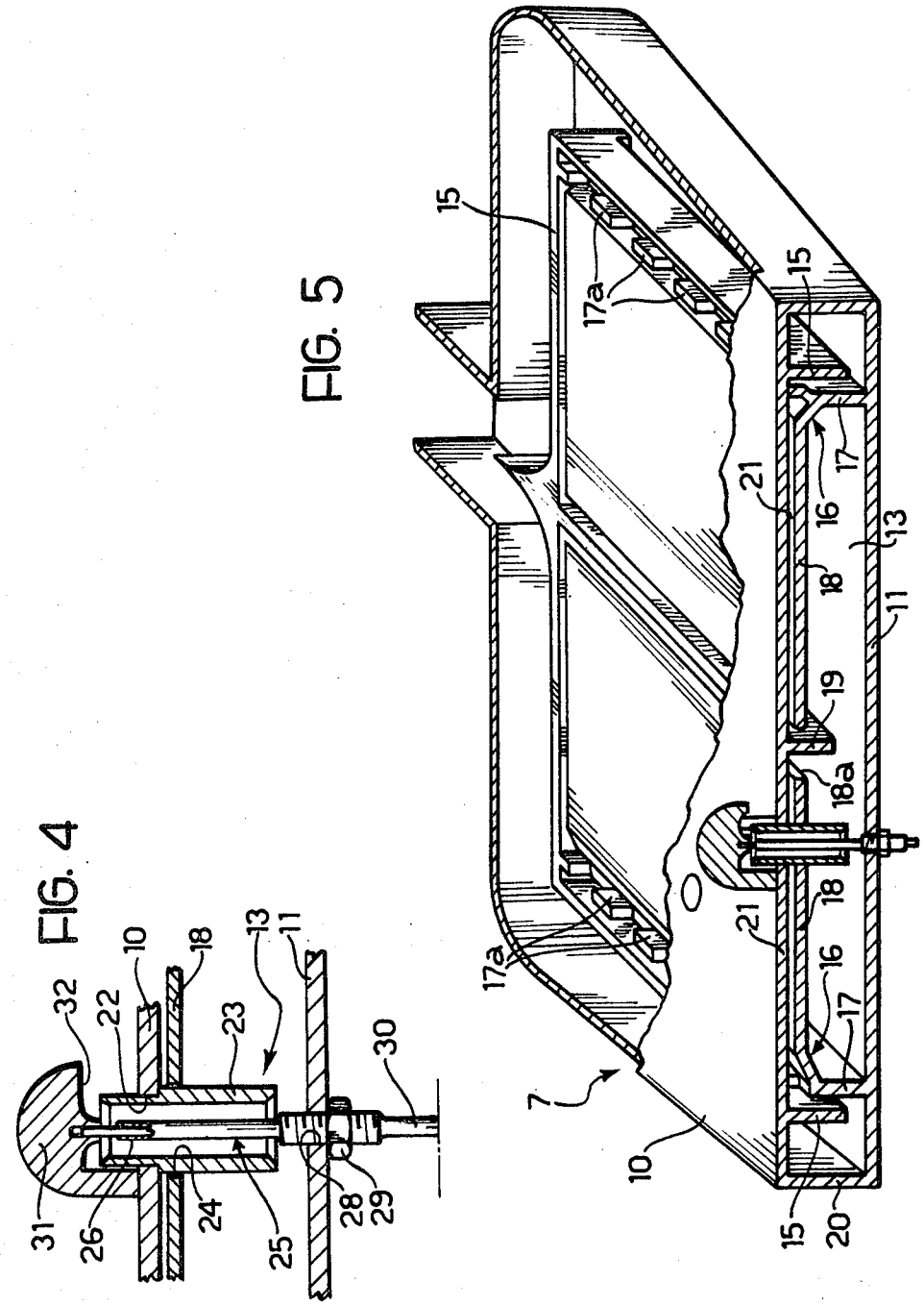

FLUIDIZED BED FURNACE

BACKGROUND AND FIELD OF THE INVENTION

The present invention relates to furnaces with fluidized beds.

In particular, the invention relates to a furnace of the type comprising a bed of refractory particles and means for supplying a combustible gas and air to the bed so as to enable the combustible gas to burn within the bed and to fluidize the bed.

In a previous heater having a structure of the type indicated above, the combustible gas and the air are introduced separately into the bed whereby these mix only once they have entered the bed. This solution does not achieve complete mixing nor a uniform distribution of the combustible gas and the air within the bed, and consequently does not allow complete combustion of the combustible gas.

In an attempt to obviate this disadvantage, heaters have also been made in which the combustible gas is mixed with the air before being passed into the bed. In this case, however, it is necessary to provide the heater with means for preventing the combustible gases from burning before entering the bed. For this purpose, for example, a plate of porous ceramic material has been used to act as a base for the bed of refractory particles. The main disadvantage of this solution lies in the fact that, in order for the plate of ceramic material to present sufficient resistance to the flow of heat from the bed to the exterior, it must have a much greater thickness than that necessary to allow it to support the weight of the bed. Consequently, the plate presents a fairly high resistance to the flow of the gaseous mixture.

OBJECTS AND SUMMARY OF THE INVENTION

The object of the present invention is to provide a furnace with a fluidized bed of refractory particles and means for supplying a combustible gas and air to the bed so as to enable the combustible gas to burn within the bed and to fluidize the bed, which is free from the disadvantages mentioned above.

In order to achieve this object, the invention provides a furnace characterized in that it includes a base wall which supports the bed of refractory particles, in that the said means for supplying the air comprises a plurality of holes formed in the base wall through which the air is fed into the bed, and in that the said means for supplying the combustible gas comprises a plurality of nozzles disposed coaxially within the said holes, each supply nozzle having at least one discharge aperture for the combustible gas disposed adjacent the plane of the base plate.

By virtue of this characteristic, in the furnace according to the present invention, the mixing of the combustible gas with the air is achieved neither upstream nor downstream of the passages for the inlet of the combustible gas and air into the bed, but actually in these passages.

Thus complete mixing and a uniform distribution of the combustible gas and the air within the bed is achieved and, in addition, the risk of the combustible gas burning before entering the bed is avoided.

The furnace according to the present invention is usable particularly as a calcining furnace for the regeneration of sands from casting boxes and cores.

According to a preferred characteristic of the invention, within each hole of the said base plate is fixed a tubular air-supply element which surrounds the respective nozzle for supplying the combustible gas, the said furnace further including, in correspondence with each hole, a cap element surmounting the upper end of the tubular element and provided with passages for feeding the mixture of combustible gas and air leaving the upper end of the tubular element into the bed.

The said cap element improves the mixing of the combustible gas with the air. For this purpose, the lower surface of each cap element is preferably helically scored to induce turbulence in the mixture flow.

According to a further preferred characteristic, the supply means for the air include a series of labyrinthine passages arranged to make the air flow over the lower surface of the said base plate before the air is fed to the said holes in the base wall.

Thus, cooling of this wall is achieved in a simple and efficient manner.

BRIEF DESCRIPTION OF THE DRAWINGS

Further characteristics and advantages of the present invention will emerge from the description which follows with reference to the appended drawings, provided purely by way of non-limiting example, in which:

FIG. 4 is a view on an enlarged scale of a detail of FIG. 2, and

FIG. 5 is a partially-sectioned, perspective view of a detail of the furnace according to the invention.

DETAILED DESCRIPTION OF AN EMBODIMENT OF THE INVENTION

Figure 1:
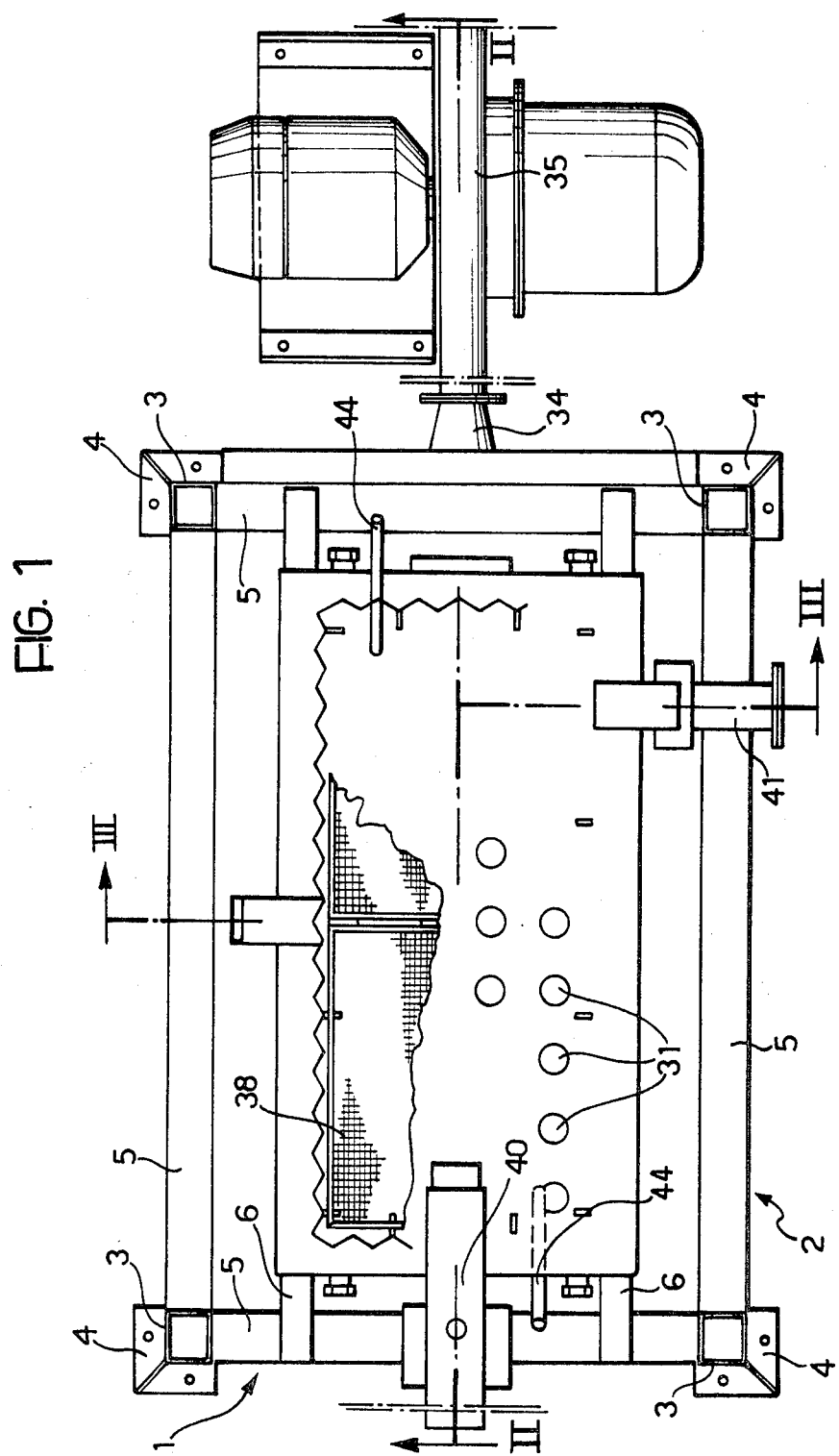
FIG. 1 is a schematic plan view of a calcining furnace according to the present invention.

In the drawings, a fluidized-bed calcining furnace generally indicated 1 is usable particularly for regenerating sands from casting boxes and cores.

The furnace 1 is provided with a support structure 2 which, in the example illustrated, comprises four vertical pillars 3 each provided at its lower end with a support foot 4 intended to be anchored to the ground. The vertical pillars 3 support, at about half their height, a rectangular, horizontal frame formed by four beams 5 having, like the vertical pillars 3, a hollow square cross-section. Two opposite beams 5 support a base structure 7 by means of two cross pieces 6 constituted by two C-sections, the base 7 being illustrated on an enlarged scale in FIG. 5. This figure illustrates part of the base structure 7 in a partially-sectioned perspective view.

Above the base structure 7 are fixed four perpendicular walls 8 which define the chamber 9 of the furnace. These walls are each provided externally with a ceramic-fibre coating wall 19.

As shown in detail in FIG. 5, the base structure 7 includes a flat horizontal wall 10 intended to act as a base wall for a bed of refractory particles.

The structure 7 further includes a flat horizontal wall 11 disposed below the wall 10.

Figure 2:
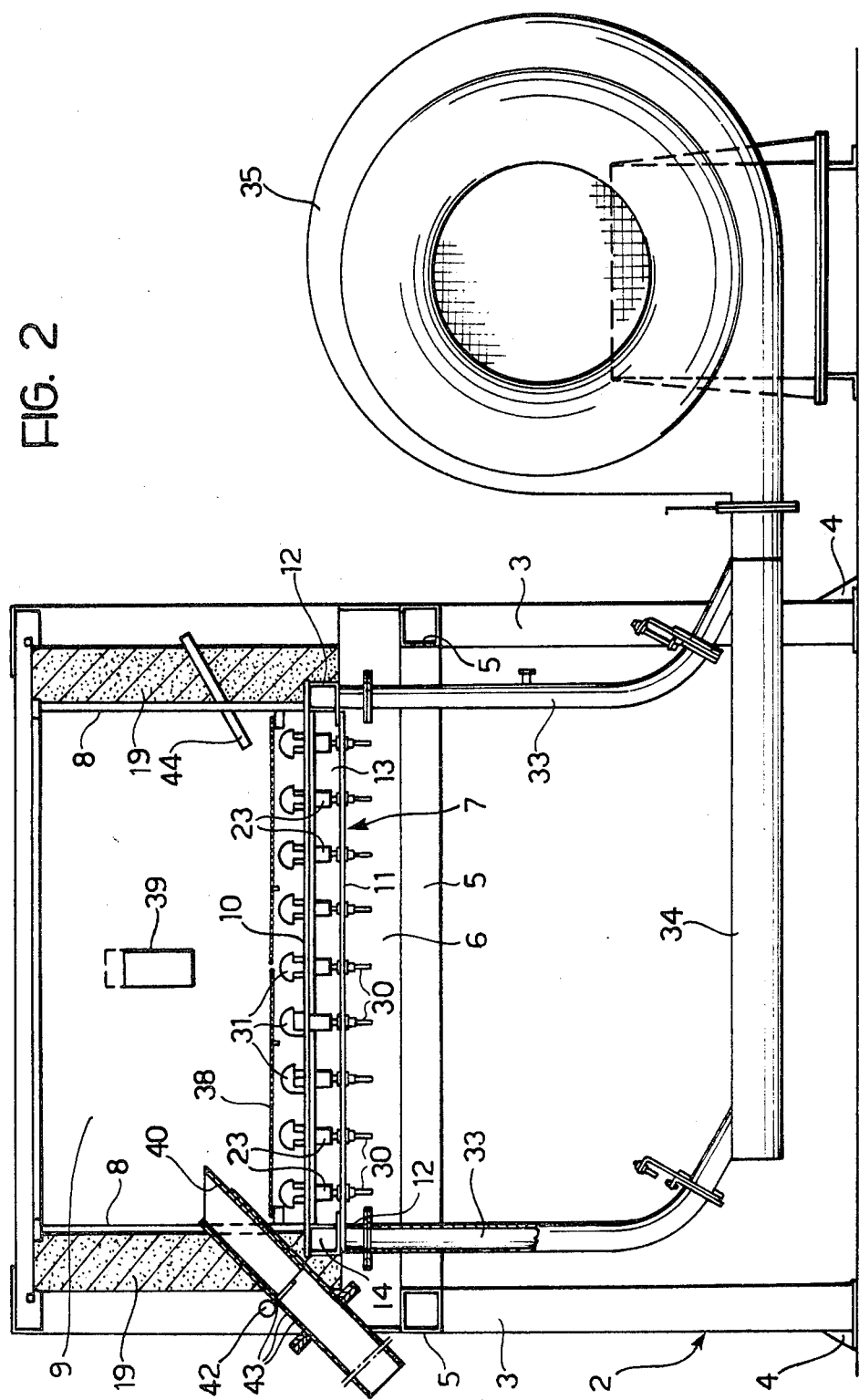
FIGS. 2, 3 are sections taken along lines II—II and III—III respectively of FIG. 1.
Figure 3:
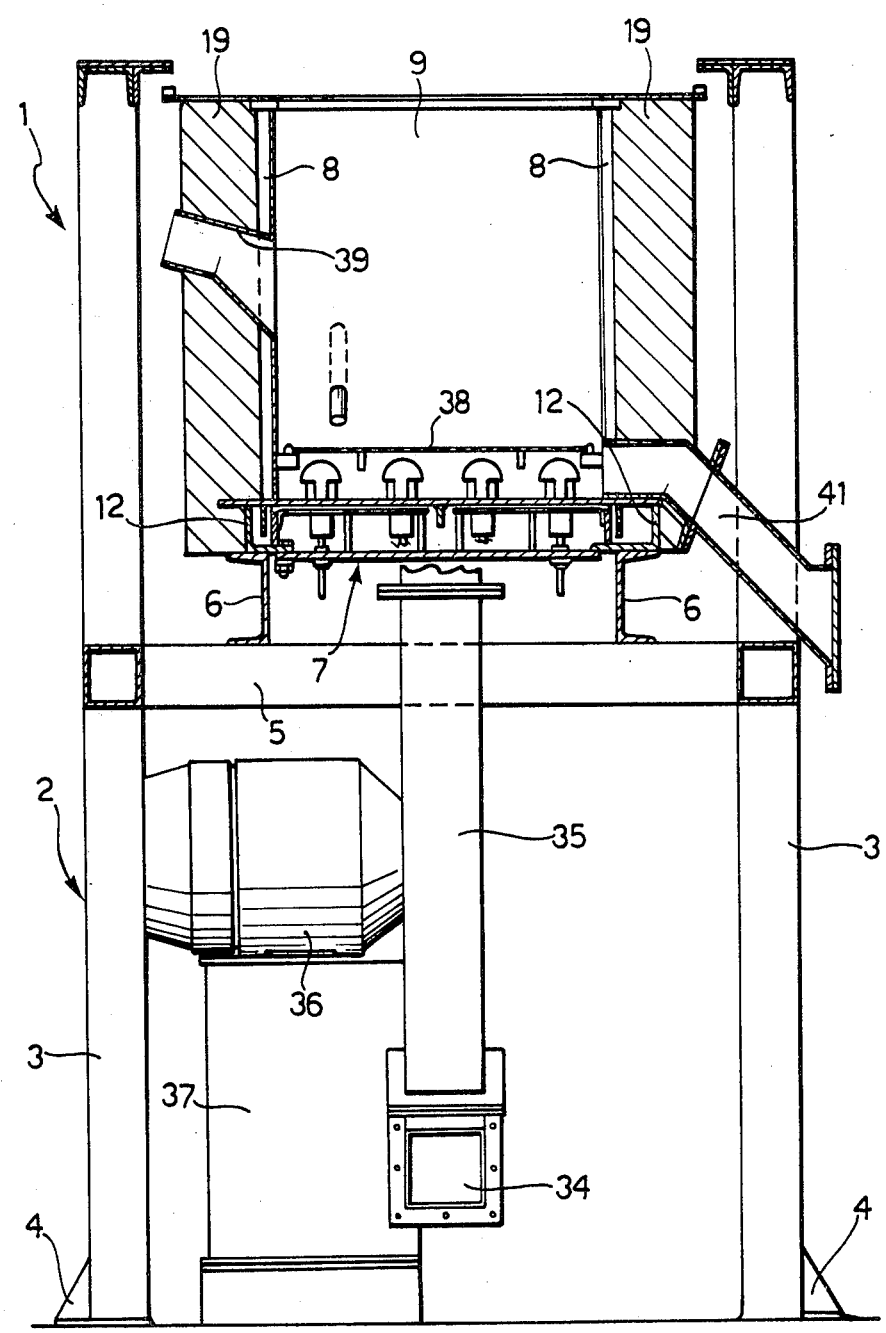

In FIG. 5 the walls 10, 11 have been illustrated schematically as parts of a structure formed in a single piece. In practice the wall 11 (see FIGS. 2, 3) is joined to the wall 10 by means of lengths of angle-iron 12 which, together with these walls, define a closed chamber 13.

The lengths of angle-iron 12 at two opposite sides of the base structure 7 have apertures (one of which is indicated schematically in FIG. 5 by the reference numeral 14) for allowing air into the chamber 13.

The walls 10, 11 are provided with septa projecting into the chamber 13 to define a labyrinthine path for the air which is supplied to the chamber 13.

In particular, the lower side of the wall 10 has four septa 15 (three of which are seen in FIG. 5) terminating a short distance from the wall 11, which divide the chamber 13 into a central part and an annular peripheral chamber communicating with the two inlets 14. That part of the chamber 13 within the septa 15 is in turn sub-divided by two walls 16 projecting from the wall 11. Each wall 16 has a vertical section 17 adjacent a septum 15 and a horizontal section 18 adjacent the wall 10. The two horizontal sections 18 of the walls 16 have two facing edges 18a which terminate a short distance from each other. A vertical wall 19 projects from beneath the wall 10 into the zone separating the edges 18a. The vertical section 17 of each wall 16 is further provided at its upper edge with a series of lugs 17a which extend up to the wall 10 so as to define a plurality of passages for communication between the annular peripheral chamber, indicated by 20, defined by the septa 15, and the space indicated by 21, between the wall 10 and the two walls 18.

The base wall 10 is provided with a plurality of holes 22 within which are fixed tubular elements 23.

With reference to FIG. 4, each tubular element 23 has an upper end terminating slightly above the base wall 10 and a lower end communicating with the central part of the chamber 13. Each wall 18 has holes 24 to allow the assembly of the tubular elements 23.

Within each tubular element 23 extends a nozzle 25 for the discharge of combustible gas. Each nozzle 25 is constituted by a tube provided at its upper end, at a height substantially corresponding to that of the base wall 10, with discharge holes 26. Each nozzle 25 has, at its lower end, a screw-threaded body 27 which is fixed in a corresponding hole 28 in the wall 11 by means of a nut 29. The lower ends 30 of the nozzles 25 communicate through flexible tubes with means for supplying a combustible gas.

The upper end of each tubular element 23 is surmounted by a cap element 31. The cap element 31 rests on the upper surface of the wall 10 and is provided with three equiangularly-spaced passages 32 (only one of which is visible in FIG. 4) for communication between the interior of the tubular element 23 and the chamber 9 of the furnace.

The two air-supply inlets 14 communicate with two pipes 33 (see FIG. 2) which branch from a single delivery pipe 34 connected to the outlet of a fan 35 rotated by an electric motor 36 supported by a support structure 37.

The air supplied by the fan 35 reaches the supply inlets 14 through the pipes 34 and 33. From the inlets 14 the air flow passes successively into the annular chamber 20, into the space 21 and into the central part of the chamber 13 of the base structure 7. From here the air flow is supplied through the tubular elements 23 to the interior of the chamber 9 of the furnace. The combustible gas supplied to the nozzles 25 flows out of the discharge holes 26 of each nozzle 25 and mixes with the air at the moment of entry into the chamber 9 of the furnace.

The cap elements 31 are arranged to facilitate the mixing of the combustible gas with the air. For this purpose, the lower surface of each cap element 31 may be provided with helical scoring so as to induce a certain degree of turbulence in the flow.

The furnace further includes a flue structure (not illustrated) surmounting the chamber 9 for communication between the latter and the chimney. A duct for feeding material to be calcined to the furnace is formed in the flow structure.

This material may, for example, be constituted by pieces of casting cores and boxes constituted by sand mixed with binding materials of various types.

Above the base wall 10 is located a metal mesh 38 for keeping the materials to be calcined, introduced into the chamber 9 separate from the bed of refractory particles with which the furnace is provided.

In addition, the furnace is provided with an opening 39 for the insertion of a burner for igniting the mixture of air and combustible gas, a discharge duct 40, the height of which is adjustable, for discharging regenerated sand, and a duct 41 (see FIGS. 1, 3) for emptying out the bed of refractory particles. The discharge duct 40 is constituted by two tubular elements disposed coaxially one within the other and fixable in different positions with respect to each other by means of a transverse pin 42 insertable in any one of a plurality of holes 43.

The furnace is finally provided with two thermocouples 44.

In operation, the air and the combustible gas are supplied in the manner described above to the tubular elements 23 and to the nozzles 25 so that they mix together at their moment of entry into the chamber 9 of the furnace. As a result of ignition by the burner with which the furnace is provided, the combustible gas burns within the bed of refractory particles at the same time causing fluidization. Under the fluidized conditions, the free surface of the bed of refractory particles is located at the height of the upper end of the discharge opening 40.

The material to be calcined is introduced into the chamber 9 of the furnace and as the sand is regenerated it is discharged through the duct 40 while the binding materials volatalize.

When it is necessary to empty out the bed of refractory particles, use is made of the discharge duct 41.

In the furnace described above, the mixing of the combustible gas with the air is effected at the moment at which the combustible gas and the air are fed into the chamber of the furnace. This, on the one hand, achieves complete mixing and a uniform distribution of the combustible gas and the air within the bed and, at the same time, avoids the risk of the combustible gas burning before entering the bed.

The particular conformation of the base structure 7 constrains the air to flow over the lower surface of the base plate 10 of the bed before it is fed into the chamber 9. Thus cooling of the wall 10 is achieved simply and efficiently.

Naturally, the principle of the invention remaining the same, the details of construction and the embodiments may be varied widely with respect to that described and illustrated purely by way of example, without thereby departing from the scope of the present invention.

For example, each cap element 31 and the corresponding tubular element 23 may be formed in a single piece.

What is claimed is:

1. A fluidized bed furnace comprising:
    a support for a bed of refractory particles;
    a plurality of air supply means disposed in said support for supplying air to said bed;
    combustible gas supply means disposed within said air supply means and including a gas discharge means for supplying combustible gas to said bed, said discharge means positioned above said support;
    an air chamber located immediately below said support and being in communication with said air supply means, said air chamber including at least one air inlet means for introducing air into said air chamber for distribution to said air supply means; and
    partition means positioned within said air chamber for causing air to flow across substantially the entire undersurface of said support.

2. A fluidized bed furnace as in claim 1, wherein said air supply means comprises a plurality of air supply conduit means in said support surrounding said combustible gas supply means and including an air discharge means positioned above said support.

3. A fluidized bed furnace as in claim 2, wherein said furnace includes a cap means positioned above said air discharge means and said combustible gas discharge means, said cap means having a lower surface configured to facilitate the mixing of said combustible gas and air.

4. A fluidized bed furnace as in claim 3, wherein said lower surface of said cap element is provided with helical scoring for facilitating the mixing of said combustible gas and air.

5. A fluidized bed furnace as in claim 3, wherein said cap means is integral with said air supply conduit means.

6. A fluidized bed furnace as in claim 1, wherein said partition means define a series of continuous labyrinthine passages.

7. A fluidized bed furnace comprising:
    a support for a bed of refractory particles;
    an air chamber located immediately below said support and including at least one air inlet means for introducing air into said air chamber;
    a plurality of air supply conduit means in said support being in communication with said air chamber and including an air discharge means positioned above said support for supplying air to said bed;
    combustible gas supply means disposed within said air supply conduit means and including a gas discharge means positioned above said support for supplying combustible gas to said bed; and
    partition means positioned within said air chamber for causing air to flow across substantially the entire undersurface of said support.

8. A fluidized bed furnace as in claim 7, wherein said furnace includes a cap means positioned above said air discharge means and said combustible gas discharge means, said cap means having a lower surface configured to facilitate the mixing of said combustible gas and air.

9. A fluidized bed furnace as in claim 8, wherein said lower surface of said cap element is provided with helical scoring for facilitating the mixing of said combustible gas and air.

10. A fluidized bed furnace as in claim 8, wherein said cap means is integral with said air supply conduit means.

11. A fluidized bed furnace as in claim 7, wherein said partition means define a series of continuous labyrinthine passages.

* * * * *